US011100806B2

(12) United States Patent
Siboni et al.

(10) Patent No.: US 11,100,806 B2
(45) Date of Patent: Aug. 24, 2021

(54) MULTI-SPECTRAL SYSTEM FOR PROVIDING PRECOLLISION ALERTS

(71) Applicant: FORESIGHT AUTOMOTIVE LTD., Ness Ziona (IL)

(72) Inventors: Haim Siboni, Lod (IL); Dror Elbaz, Tel Aviv (IL); Roman Shklyar, Holon (IL); Elazar Elkin, Karnei-Shomron (IL)

(73) Assignee: FORESIGHT AUTOMOTIVE LTD., Ness Ziona (IL)

( * ) Notice: Subject to any disclaimer, the term of this patent is extended or adjusted under 35 U.S.C. 154(b) by 0 days.

(21) Appl. No.: 16/960,452

(22) PCT Filed: Jan. 7, 2019

(86) PCT No.: PCT/IL2019/050034
§ 371 (c)(1),
(2) Date: Jul. 7, 2020

(87) PCT Pub. No.: WO2019/135246
PCT Pub. Date: Jul. 11, 2019

(65) Prior Publication Data
US 2020/0349846 A1 Nov. 5, 2020

Related U.S. Application Data

(60) Provisional application No. 62/614,523, filed on Jan. 8, 2018.

(51) Int. Cl.
*G08G 1/16* (2006.01)
*H04N 13/128* (2018.01)
(Continued)

(52) U.S. Cl.
CPC ............. *G08G 1/166* (2013.01); *B60Q 9/008* (2013.01); *H04N 13/128* (2018.05);
(Continued)

(58) Field of Classification Search
CPC ...... G08G 1/166; G08G 1/167; H04N 13/128; H04N 13/167; H04N 13/239;
(Continued)

(56) References Cited

U.S. PATENT DOCUMENTS

2008/0208409 A1  8/2008 Matsumoto et al.
2010/0183192 A1  7/2010 Fritsch et al.
(Continued)

FOREIGN PATENT DOCUMENTS

WO    2017/115371 A1    7/2017

OTHER PUBLICATIONS

International Preliminary Report on Patentability for PCT/IL2019/050034, dated May 5, 2020 (15 pages).
(Continued)

*Primary Examiner* — Nasim N Nirjhar
(74) *Attorney, Agent, or Firm* — Roach, Brown, McCarthy & Gruber, P.C.; Kevin D. McCarthy

(57) ABSTRACT

A multi-spectral vehicular system for providing pre-collision alerts, comprising two pairs of stereoscopic infrared (IR) and visible light (VL) sensors, each of which providing acquired image streams from a mutual field of view, which are synchronized to provide stereoscopic vision; a data fusion module for mutually processing the data streams, to detect objects within the field of view and calculating distances to detected objects; a cellular based communication module for allowing communication between the sensors and mobile phones/Infotainment systems of the vehicle. The module runs a dedicated background application that is adapted to monitor the vicinity of the vehicle to detect other vehicles having a similar system; calculate speed and heading azimuth of each of the other vehicles; and provide alerts to the driver of the vehicle whenever other vehicles having (Continued)

a similar system are in a path of collision with the vehicle, based on the calculation and on the speed of the vehicle.

10 Claims, 1 Drawing Sheet

(51) Int. Cl.
| | | |
|---|---|---|
| *H04N 13/167* | (2018.01) | |
| *H04N 13/239* | (2018.01) | |
| *B60Q 9/00* | (2006.01) | |
| *H04N 17/00* | (2006.01) | |
| *H04N 13/00* | (2018.01) | |

(52) U.S. Cl.
CPC ......... *H04N 13/167* (2018.05); *H04N 13/239* (2018.05); *H04N 17/002* (2013.01); *H04N 2013/0081* (2013.01); *H04N 2013/0096* (2013.01)

(58) Field of Classification Search
CPC ... H04N 2013/0081; H04N 2013/0096; B60Q 9/008; B60W 50/14; B60W 2050/143; B60W 2420/52; B60W 2420/40; B60W 2554/00; G06T 2207/10021; G06T 2207/10024; G06T 2207/10048; G06T 2207/30261; G06T 7/593; G06K 9/00805; B60R 21/0134

See application file for complete search history.

(56) References Cited

U.S. PATENT DOCUMENTS

| | | | | |
|---|---|---|---|---|
| 2014/0307952 | A1* | 10/2014 | Sweeney | H04N 13/271 |
| | | | | 382/154 |
| 2015/0302606 | A1 | 10/2015 | Stein et al. | |
| 2017/0277187 | A1* | 9/2017 | Refai | H04N 7/185 |
| 2017/0277197 | A1* | 9/2017 | Liao | G06T 7/20 |
| 2017/0314930 | A1 | 11/2017 | Monterroza et al. | |
| 2019/0139411 | A1* | 5/2019 | Dhull | G09F 19/18 |
| 2019/0324518 | A1* | 10/2019 | Jiao | G06F 1/3243 |

OTHER PUBLICATIONS

International Search Report for PCT/IL2019/050034, dated Mar. 25, 2019 (4 pages).
Written Opinion of the International Searching Authority for PCT/IL2019/050034, dated Mar. 25, 2019 (5 pages).

* cited by examiner

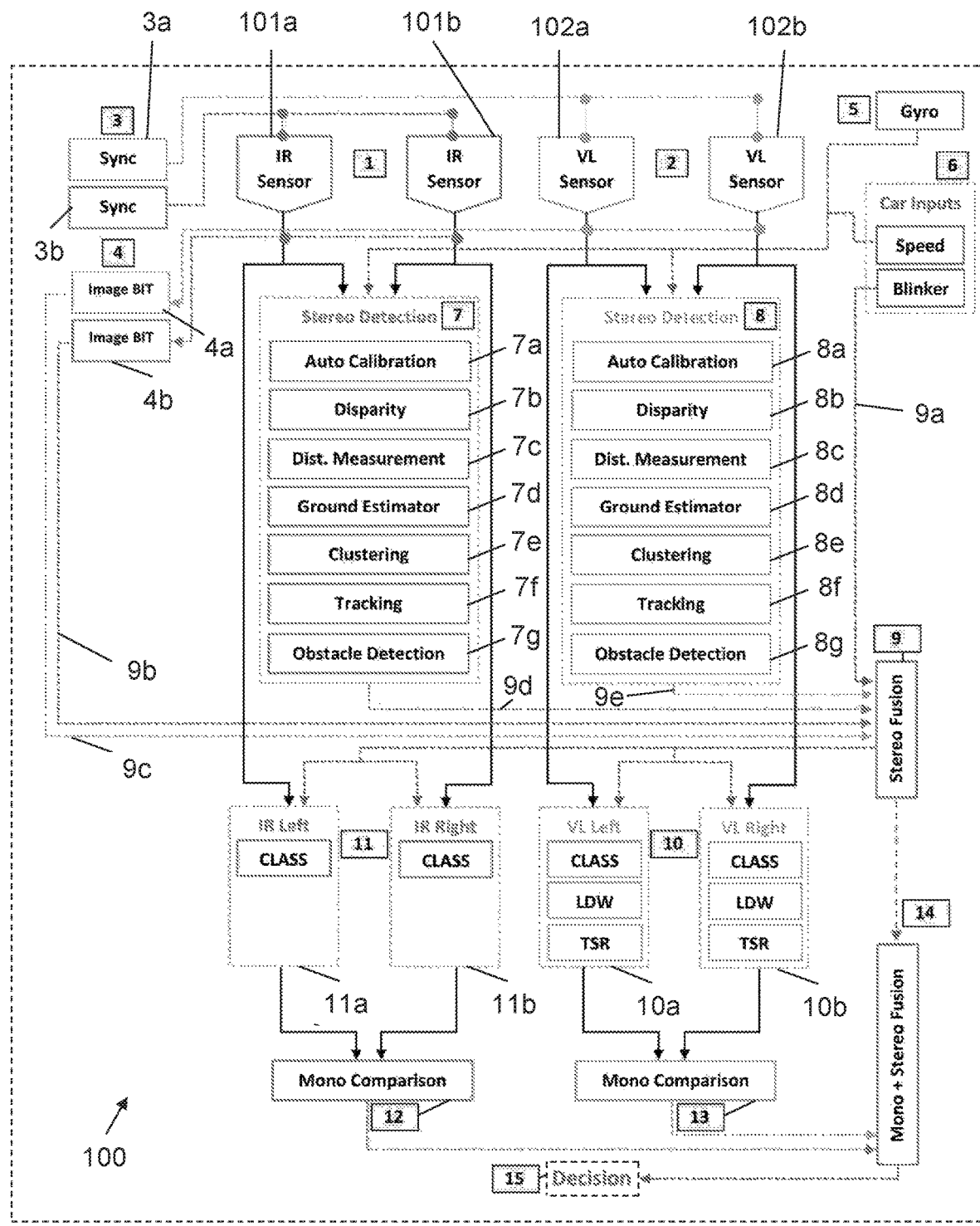

MULTI-SPECTRAL SYSTEM FOR PROVIDING PRECOLLISION ALERTS

FIELD OF THE INVENTION

The present invention relates to the field of traffic safety. More particularly, the invention relates to an apparatus for providing alerts for avoiding car accidents, resulting from violations of maintaining a minimum headway, falling asleep or losing concentration.

BACKGROUND OF THE INVENTION

Maintaining a safe headway between a moving vehicle and the next vehicle ahead is a critical cognitive task. Crashes due to insufficient vehicle headway, account for a significant portion of all crashes—over 29% in the United States. In many cases, violations of maintaining a minimum headway cause chain collisions, in which many vehicles are involved. Such chain collisions happen since, normally, a driver who decided to stop activates the braking lights only after pressing the braking pedal and starting breaking the vehicle. As a result, the driver in a car behind (the "following vehicle") gets a visual alert relatively too late (depending on the driving speed), since his reaction time (the time it takes from getting the alert until pressing the braking pedal and starting braking the following vehicle) is about 0.75 Sec. If for example, the car speed is 90 Km/h, during the reaction time the following vehicle moves 18.75 m. This distance is of course subtracted from the total braking distance and therefore, collision is unavoidable.

Also, many accidents are caused by drivers who drift from the center of their movement lane and enter other lanes of even passing the road shoulders. Therefore, a system which is capable of identifying and preventing such risky scenarios is highly desired.

US 2015/0302606 discloses a system for providing an indication of a possible collision between a vehicle and an object, which comprises a processing device configured to receive a plurality of images from a camera and identify the object and a lane marking in the plurality of images. The plurality of images is used to determine information indicative of movement of the object and a lane position associated with the object. The processing device determines whether the vehicle and the object are on collision course based on the information indicative of movement of the object and based on the lane position associated with the object.

All the methods described above, however, have not yet provided satisfactory solutions to the problem of detecting dangerous scenarios of impending collisions between vehicles or between a vehicle and an object (which is considered to be an obstacle), even under bad weather and lighting conditions.

It is therefore an object of the present invention to provide a method and apparatus for continuously and automatically detecting dangerous scenarios of impending collisions between vehicles or between a vehicle and an object, due to violations in maintaining a minimum headway or due to unawareness.

It is therefore an object of the present invention to provide a method and apparatus for continuously and automatically detecting dangerous scenarios even with very limited visibility, and/or under bad weather and lighting conditions.

Other objects and advantages of the invention will become apparent as the description proceeds.

SUMMARY OF THE INVENTION

A multi-spectral vehicular system for providing pre-collision alerts system, which comprises:

a. two pairs of stereoscopic infrared (IR) and Visible Light (VL) sensors (such as CMOS Visible Light cameras), each of which providing acquired image streams from a mutual field of view, which are synchronized to provide stereoscopic vision;
b. a data fusion module for:
  b.1.) mutually processing the data streams, to detect objects within the field of view;
  b.2) calculate distances to detected objects;
c. a cellular based communication module for allowing communication between the sensors and mobile phones/Infotainment systems of the vehicle, the module running a dedicated application, being a background application that is adapted to:
  c.1) monitor the vicinity of the vehicle to detect other vehicles having a similar system;
  c.2) calculate speed and heading azimuth of each of the other vehicles; and
  c.3) provide alerts to the driver of the vehicle whenever other vehicles having a similar system are in a path of collision with the vehicle, based on the calculation and on the speed of the vehicle In one aspect, the multi-spectral vehicular system comprises:

a. an IR and VL Stereo Detection modules, each of which consisting of an Auto-Calibration module for reconstructing 3D depth map of the stereoscopic view, based on disparity calculation and epipolar geometry, while the optical axes of both sensors are parallel;
b. a Disparity module, which receives two undistorted (radial and tangential), rectified (after transformation with the appropriate homographies) and synchronized images and creates a dense, refined disparity map;
c. a Distance Measurement module for receiving the disparity map and providing Distance per pixel;
d. a Ground Estimator module, which receives the dense and refined disparity map, along with calibrated and synchronized images and provides dense ground plane segmentation;
e. a Clustering module, which receives the dense and refined disparity map, the V-Disparity map and the Ground plane fitting and extracts obstacles from the image stream;
f. a Tracking module, which receives the dense and refined disparity map, a list of obstacles, gyro coordinates and the vehicle speed and provides an array of structures contains for all tracked obstacles;
g. an obstacle detection module, which receives a list of obstacles and speed, gyro coordinates, the car speed and ground plane fitting and provides object ID and characteristics and the estimated time to collision and provides a critical obstacle indication whenever an obstacle is found in the critical path and if the braking distance according to the correlated speed is shorter than the range to the obstacle
h. a Stereo Fusion module which receives blinker status, the IR Image BIT status, the VL Image BIT status, the distance measurement for the obstacle ahead (calculated by IR set), Distance measurement for the obstacle ahead (calculated by VL set), obstacle coordinates and size calculated by IR and the VL sets) and outputs to each of the cameras mono modules the following data: blinker status, obstacle coordinates and bounding box size and the distance to the obstacle; and
i. a Decision Module for providing audio/visual/haptic indications to the user.

The multi-spectral vehicular system may further comprise:
a. an IR Mono Comparison module for increasing the level of confidence of the classification task and of the lane departure indications by receiving the distance from the IR sensors, the obstacle classification, the lane departure indication and the line type and averaging the distance calculated by the cameras; and
b. a VL Mono Comparison module for increasing the level of confidence of the classification task and of the lane departure indications by receiving the distance from the VL sensors, the obstacle classification, the lane departure indication and the line type and averaging the distance calculated by the cameras.

The multi-spectral vehicular system may further comprise a Mono +Stereo Fusion module that receives from the Stereo Fusion module the blinker status, the obstacle coordinates, size and bounding box according to stereo sets, the distance to the obstacle, the Cameras/Images status and summarizes results from the Stereo Fusion module and the mono comparison modules and outputs the average distance from all indications, a lane departure decision and an obstacle detection decision.

Each of the cameras may be adapted to be redundant, in case the other camera in the set is malfunctioning.

Each of the cameras may have auto calibration module that allows independent placement of the cameras modules in the vehicle.

The multi-spectral vehicular system may further comprise a ground estimator that relies on non-linear fitting and adaptive ground tiling.

The image acquisition frequency may correlate to the speed of the vehicle.

The multi-spectral vehicular system may further comprise an Image Built In Tests (BIT) module, being capable of performing at least the following tests:
a. Image acquisition (Fail/Pass)
b. GL histogram (Image brightness/Image darkness)
c. Partial occlusions (detect stains on the windshield)
d. Color histogram (detect failed channels)
e. Time stamp validation to verify synchronization The multi-spectral vehicular system may further comprise a gyro for obtaining the exact heading of the vehicle per each frame, to thereby ignore obstacles that are not in front of the vehicle.

The vehicle may provide one of more of the following inputs:
Speed
Blinker state for detecting lane departure The dedicated application may provide a depth map, based on disparity calculation relies on epipolar geometry that can be used while the optical axes of both sensors are parallel.

The distance to the obstacle may be calculated as average between the two stereoscopic sets.

If one of the sensors is malfunctioning, the remaining mono module may receive the distance according to the working set.

BRIEF DESCRIPTION OF THE DRAWINGS

In the drawings:
FIG. 1 illustrates the architecture of the system, proposed by the present invention.

DETAILED DESCRIPTION OF THE INVENTION

The present invention is related to an accident avoiding system and method. Dangerous scenarios of impending collisions between vehicles or between a vehicle and an object, due to violations in maintaining a minimum headway, or due to unawareness, are automatically and accurately detected under any conditions, even with very limited visibility, and/or under hard weather conditions. The system uses two pairs of sensors such as cameras: one pair includes Visible Light (VL) sensors and the other pair includes Infra-Red (IR) sensors. Images that are acquired from both pairs are mutually processed, in order to obtain a stereoscopic view, which allows much better distance estimation and detection capabilities.

The system proposed by the present invention has two important features, which are essential for increasing driving safety: Line of sight detection capability and the ability to provide out of sight pre-collision alerts.

Line of Sight Detection

The proposed system includes a multi spectral vision layer, which receives data streams from four cameras, consisting of a pair of stereoscopic (thermal) Infra-Red (IR) cameras and a pair of Visible Light (VL) cameras. Each pair operates as an artificial module that mimics and enhances the biological mechanism of human depth perception. The data streams received from both pairs is processed to provide seamless fusion of data, such that maximum accuracy is obtained. The combination of both Infrared and visible light cameras allows the system to be fully operational under all weather and lighting conditions (such as complete darkness, rain, haze, fog and glare).

Out of Sight Pre-Collision Alerts

The proposed system also includes cellular-based communication between the two pairs of sensors and mobile phones/Infotainment systems (IoS/Android). The system runs a dedicated application, which monitors the vicinity of each car with respect to the car's speed, and provides alerts whenever other vehicles are found to be in a path toward certain collision, according to the calculated speed and heading azimuth of each vehicle.

The proposed system 100 is adapted to perform out of sight detection and will include a SIM card and a dedicated application, which will be installed and will run continuously in the background. The application will identify the cars movement and send the cars location to a main server at a high frequency. The car location will be calculated, based on data fusion of "Gyro, GPS, Speed" indications and on roads snapping. The application samples the main server at a high frequency, to receive updates on users near the car. Based on the most frequent updates, the application calculates the azimuth and speed of each of the users in the area and predicts potential collisions. In case of detecting a potential collision, the system will provide visual and audio alerts.

FIG. 1 illustrates the architecture of the system 100, proposed by the present invention.

The system 100 includes a pair of IR Sensors 101a and 101b, which may be two long wave thermal Infra-Red (IR) cameras. The IR cameras acquire images at a frequency that corresponds to the speed of the vehicle, and up to 45 frames per second (i.e., dynamic Frames Per Second (FPS)—the image acquisition frequency correlates to the speed of the car (higher speed=higher frequency up to 45 FPS). The acquired frames are transferred in parallel to three IR modules: Stereo Detection IR module 7, Left IR mono module 11a and Right IR mono module 11b.

The system also includes a pair of VL Sensors 102a and 102b, which may be two CMOS Visible Light (VL) cameras, which acquire images in frequency that correlates to the speed of the vehicle and up to 45 frames per second ("Dynamic FPS"). The acquired frames are being transferred in parallel to three VL modules: Stereo Detection VL module 8, Left VL module 10a and Right VL module 10b.

In order to obtain stereoscopic view, two synchronized images are required. Each of the two sets of images (IR and VL) are connected to two corresponding synchronization units 3a and 3b that provide the same clock to the two sensors and makes sure that the acquired images will be with exactly the same time stamp.

In order to have images with appropriate quality, two image Built In Test (BIT) units 4a and 4b are employed by each pair. Each BIT unit receives images from the cameras, as well as the vehicle speed (from the vehicle's OBD 6) and gyro indication regarding the vehicle's orientation from a Gyro unit 5. Since the proposed system is capable of detecting all obstacles under all weather and lightning conditions, the system uses the gyro data to obtain the exact heading of the vehicle per each frame. When the heading of the vehicle is known, the system can ignore obstacles that are not in front of the vehicle.

As long as the image quality is good according to a predetermined set of thresholds, there will be no indication from the BIT unit. If the image quality is poor or does not meet the required thresholds, the BIT unit transfers the ID of the malfunctioning image to the Stereo Fusion module 14, which will be described later on. If the Speed or Gyro indications failed, a critical warning message is sent to the Stereo Fusion module.

The vehicle's speed is essential for calculating the car braking distance, in order to provide an appropriate alert. A "Lane departure warning" algorithm is activated for detecting lane departures, based on the status of the vehicle's blinker. As long as the blinker is on, there will be no alerts regarding lane departure.

The proposed system 100 comprises two main detection modules: an IR Stereo Detection module 7 and a VL Stereo Detection module 8. Both modules use stereoscopic vision technology, which is capable of obtaining a real depth scene map, which helps accurate object classification and distance estimation.

IR Stereo Detection Module

The IR Stereo Detection module 7 comprises the following sub-modules:

The first sub-module is an Auto-Calibration module 7a, which reconstructs 3D depth map of the stereoscopic view, based on disparity calculation and epipolar geometry that can be used while the optical axes of both cameras are parallel. Auto calibration allows independent placement of the cameras modules in the vehicle.

Calibration is performed using synchronized images received from both cameras, which are directed to the same scene, ending with aligned images with known magnification factor. Since the system 100 comprises two independent cameras, it has 3 degrees of freedom (rotation around X/Y/Z axis of both left and right cameras). Therefore, the calculated transformation provides a non-unique solution of homographies, which may cause unstable results and large errors in distance calculations. The system 100 uses a new rectification process, based on epipolar geometry that is discussed later on.

Initial calibration is performed on a pattern with predefined objects (e.g., a chessboard with predefined size of squares) placed at different distances and with respect to different rotations. This process calculates a set of intrinsic parameters (e.g., principal point, focal length, radial and tangential distortion) for each camera. The stereo vision calibration of each pair of cameras may be done using, for example, the Burger-Zhang's camera calibration algorithm (an algorithm for camera calibration, based on well-defined points in space with known coordinates).

The calibration method comprises several steps. The first step includes (first) manual (rough) calibration upon a designated target, which is placed in front of a vehicle, on which two independent cameras are installed. The two independent cameras may be installed for example, behind the windshield or the car's beams, head lights car's grill, etc.) At the second step, two extrinsic parameters are calculated: the orientation of each camera in relation to the optical axis and orientation of each camera (i.e., rotation and translation). At the next step, matching points are found using a Speeded Up Robust Features (SURF) algorithm (which is a local feature detector and descriptor that can be used for tasks such as object recognition, image registration, classification or 3D reconstruction). At the next step, outliers from the set of matching points are refined and initial fundamental matrix (means for matching in stereo vision: when imaging, each pixel, for example, in the left camera has a corresponding pixel in the right camera, and this matrix is making the matching) estimation is performed At the next step, iterative fundamental matrix estimation is performed by minimization.

At the next step, initial calculation of the left and right homographies (in projective geometry, a homography is an isomorphism of projective spaces, induced by an isomorphism of the vector spaces from which the projective spaces derive. It is a bijection (a one-to-one correspondence between a set of points, in this case, the stereo matching) that maps lines to lines, and thus a collineation. In general, some collineations are not homographies, but the fundamental theorem of projective geometry asserts that is not so in the case of real projective spaces of dimension at least two) is performed using epipolar geometry (epipolar geometry is the geometry of stereo vision. When two cameras view a 3D scene from two distinct positions, there are a number of geometric relations between the 3D points and their projections onto the 2D images that lead to constraints between the image points).

At the next step, the best homographies are iteratively calculated by using the intrinsic parameters of the cameras, center point fix, W-offset (the distance deviation between the sensor's center and the optics center) fix. At the next step, the best fitted intrinsic parameters for homographies, valid on the complete set of the frames, are estimated. As misalignment error grows as quadratic function of disparity value and since the cameras are not place on unified rigid structure, the system 100 is capable of fixing in real time misalignments that can be obtained as result of shake. This ability is referred to as auto-calibration method, which calculates the intrinsic and extrinsic parameters according to last calculated auto calibration. At the next step, the set of matching points on the overlapping area captured by the left and right cameras are calculated. At the next step, homographies that transform the image spaces of both cameras (Rectification process) are calculated using the overlapped matching points. This process is repeated periodically every time the vehicle is not moving (velocity=zero).

Matching FOVs

IR and visible range cameras are using different sensors: different in size, pitch (pixel size) and of course spectral range sensitivity. The camera's focal length is not the same for both sensors, so that each of the two channels has basically its own Field Of View (FOV). The calibration process ensures the same orientation, but the FOV overlap is to be selected for further system operation. An overlap matching module is to perform this feature in an automatic way.

The second sub-module is a Disparity module 7b, which receives two undistorted (radial and tangential), rectified (after transformation with the appropriate homographies) and synchronized images and creates a dense, refined disparity map according to the following steps: At the first step, an initial cost function (for initial disparity) is calculated using the Census correlation (adding textures). At the next step, Semi-Global Block Matching (SGBM) algorithm is Used with reduced number of degrees based on the calibration results. At the next step, the image is split to vertical stripes and calculate the SGBM algorithm per stripe. At the next step, global fit from all stripes is performed, to create a global disparity map. At the next step, stereo segmentation is calculated on the left stereo image (left disparity) adding the texture map fitting (by using Census transform), while applying averaging adaptive median filter.

The third sub-module is a Distance Measurement module 7c, which receives the disparity map and provides a Distance per pixel (Distance per pixel=(Focal lens*Baseline/Disparity), using standard method of calculating.

The fourth sub-module is the Ground Estimator module 7d, which receives the dense and refined disparity map, along with calibrated and synchronized images and provides dense ground plane segmentation, according to the following steps: At the first step, a V-Disparity map (each row of the V-disparity image is a histogram of the various values of disparity that appeared on that row in the disparity map. When done right, the disparities of the points on the ground plane will appear as a strong line in the V-disparity map) is calculated, where each row of the V-Disparity image is the histogram of the various disparity values that appeared on the appropriated row in the computed disparity map. The disparities of the points on the ground plane will appear as the strong (non-vertical) line in the v-disparity map. The disparities of the points which belong to the obstacles will appear as the vertical line segments in the v-disparity map. At the next step, the initial cluster of the ground plane points is found, using the v-disparity (could be sufficient in case of the flat road geometry-road the pure plane). At the next step, non-linear fitting of the cluster of the ground plane points (the common case of non-flat road geometry is performed.

Fitting to the surface of order 2 (found sufficient by statistical observations) are performed by splines. The ground is tiled by dividing the initial ground points cluster (the different points selected on the ground, in order to define the ground estimator) to sub areas. The (local) fitting performed on the sub areas and the following global fit, include the vanish point constraint (for ground estimator in non-paved or structured roads, the lanes borders are set by estimating the vanishing: the horizon, or the point where two parllel lines are joined in perspective of course), implemented to optimize the result. The sub areas are adaptively calculated, such that closer points will get larger sub area while facer points will get smaller sub area.

The fifth sub-module is the Clustering module 7e, which receives the dense and refined disparity map, the V-Disparity map and the Ground plane fitting (estimating range mapping for every pixel, based on the disparity map) and in response, extract obstacles from the image stream (e.g., by adding bounding boxes and providing 2D coordinates). At the first step, the v-disparity map is used to extract the ground plane cluster and to perform initial segmentation of objects, which are not on the road. The disparities of the points which belong to the obstacles will appear as vertical line segments.

At the next step, disparities which belong to same object on the disparity map are locally accumulated. At the next step, bounding boxes are built around the obstacles, in order to extract them.

The sixth sub-module is the Tracking module 7f, which receives the dense and refined disparity map, a list of obstacles, gyro coordinates and the vehicle speed and provides an array of structures contains for all tracked obstacles. This process may be done, for example, by using Kalman Filter prediction.

The seventh sub-module is the obstacle Detection module 7g, which receives a list of obstacles and speed, gyro coordinates, the car speed and ground plane fitting and provides object ID and characteristics (such as size, speed) and the estimated time to collision. If an obstacle is found in the critical path (not under Gyro mask) and if the braking distance according to the correlated speed (Self speed minus obstacle speed) is shorter than the range to the obstacle, the module will provide a critical obstacle indication.

VL Stereo Detection Module

The VL Stereo Detection module 8 comprises the same sub-modules 8a-8g as of the IR Stereo Detection module 8. The same processing is performed, but on the VL images.

Stereo Fusion Module

The Stereo Fusion module 9 receives the following inputs: blinker status 9a, the IR Image BIT status 9b, the VL Image BIT status 9c, the distance measurement for the obstacle ahead (calculated by IR set), Distance measurement for the obstacle ahead (calculated by VL set), obstacle coordinates and size (calculated by IR set), obstacle coordinates and size (calculated by VL set) via data buses 9d and 9e. After processing, the Fusion module 9 outputs to each of the cameras mono modules 11a, 11b, 10a and 10b the following data: blinker status, obstacle coordinates and bounding box size and the distance to the obstacle. If all four sensors (cameras) 101a, 101b, 102a, 102b are available (according to the image BIT units 4a and 4b), the distance is calculated as average between the two stereoscopic sets. If one of the sensors is malfunctioning, the system will provide indications about malfunctioning cameras and the other mono module will receive the distance, according to the working set.

The proposed system 100 is adapted to apply several fusion levels. Data fusion between visible and IR channels may be performed in several ways. The simplest way is to switch between the channels and to select the "best channel" according to predefined criteria (e.g., image quality, SNR/SBR). Another way is to activate both of them, and to fuse the detection results. A sophisticated module may fuse the channels at an earlier level: the disparity maps. It is possible to fuse between the two maps (after registration) in order to deal only with a single map for objects detection.

If according to the BIT units 4 as and 4b, all four sensors (cameras) are available, the distance to an object is calculated as average between the two stereoscopic sets. If one of the sensors is malfunctioning, the other mono module will receive the distance according to the working set. This architecture allows the system to have 4 level of redundancy. In a full operational set, two IR cameras (Stereo)+two VL cameras (Stereo) are active.

Cameras Malfunctioning

For a single camera malfunctioning, the following combinations are possible:

1 IR camera (Mono)+2 VL cameras (Stereo)
2 IR camera (Mono)+1 VL cameras (Stereo)

For a two camera malfunctioning, the following combinations are possible:

IR camera (Not operational)+2 VL cameras (Stereo)
2 IR camera (Mono)+0 VL cameras (Not operational)
1 IR camera (Mono)+1 VL cameras (Mono)

For three cameras malfunctioning, only a single camera is operational, and the following combinations are possible:

One IR camera (Mono)+no VL cameras (Not operational)
No IR camera (Not operational)+one VL cameras (Mono)

In this case, each camera acts as "Mono Vision" camera that performs the following operations:

a) Objects Classification—according to deep leaning methodology. The module can identify, for example, "Cars"/"Pedestrians"/"Cyclists" by receiving a full image acquired by the sensor and the bounding box of the obstacle (in case being available from the stereo layer) and after processing performs object classification (if the obstacle is Car/Pedestrian/Cyclist), calculates the distance to the obstacle, based on object distance estimation according to data from a single camera;

b) Lane Departure Warning (LDW)—receiving full image acquired by the sensor and the blinker status and performing lane identification, type of lines identification, percentage of deviation from the center of the lane, providing an indication for alert, in case percentage of deviation is higher than defined threshold. This is done by using convention methods for lane detection, based on Hough transform (a mathematical tool used in image processing detect straight lines) and adaptive GL threshold (by setting a threshold on the GL (gray levels) in order to differentiate between real line and noise);

c) Traffic Signs Recognition (TSR—available only in the visible light cameras)—receiving a full image acquired by the sensor and performing traffic signs identification followed by providing an alert indication in one of the following cases:

Car speed is higher than the specified allowed speed
Car speed will not allow the driver to stop in front of identified "Stop" sign
"No Entrance" sign identification Objects recognition may be done using deep leaning methodology.

JR Mono Comparison Module The IR Mono Comparison module 12 increases the level of confidence of the classification task (Car/Pedestrian/Cyclist/Other) and of the lane departure indications. This module also averages the distance calculated by the cameras. The IR Mono Comparison module 12 receives the distance from the IR sensors, the obstacle classification, the lane departure indication and the line type. During obstacle classification, if both sensors indicate about the same classification, this classification is sent to the "Mono+Stereo Fusion" module 14. If both sensors indicate about lane departure, the lane departure indication is sent to the "Mono+Stereo Fusion" module 14, otherwise, a warning indication is sent to the "Mono+Stereo Fusion" module 14. If both sensors indicate about the same line type, this line type is sent to the "Mono+Stereo Fusion" module 14 otherwise, a "Solid line" indication is sent to the "Mono+Stereo Fusion" module 14.

VL Mono Comparison Module

The functionality of the VL Mono Comparison module 13 is similar to the functionality of the IR Mono Comparison module 12, with the addition of the allowed speed using traffic sign recognition, which detects the maximum speed on the sign. If both sensors indicate the same traffic sign, the allowed speed (detected sign) is sent to the "Mono+Stereo Fusion" module 14, otherwise, the lowest speed that has been detected by both of them is sent to the "Mono+Stereo Fusion" module 14.

Mono+Stereo Fusion Module

The Mono+Stereo Fusion module 14 is a logic unit that summarizes results from the Stereo Fusion module 9 and the mono comparison modules 12 and 13. The Mono+Stereo Fusion module 14 receives from the Stereo Fusion module 9 the blinker status, the obstacle coordinates, size and bounding box according to stereo sets, the distance to the obstacle, the Cameras/Images status (according to the image BIT units 4a and 4b). The Mono+Stereo Fusion module 14 receives from the Mono Comparison units 12 and 13 the distance, the obstacle classification and the lane departure inputs and after processing the received data, outputs the average distance from all indications, a lane departure decision and an obstacle detection decision.

Decision Module

The Decision Module 15 is the output to the user, which can be audio/visual/haptic indications.

The system proposed by the present invention is also adapted to provide predictive collision warning. Advanced driver-assistance (ADAS) systems are systems to help the driver in the driving process. ADAS systems are designed to detect objects (such as pedestrians, cyclists etc.) on the road in their FOV and to alert when potential obstacles in the driving lane may lead to forward collision. However, another danger may arise from an object outside the virtual path. Considering possible crossing velocity vectors, a collision may occur (a classical example is a pedestrian trying to cross a road at some angle with respect to the moving cars, and may lead to a dangerous road accident). A module for predicting the potential collision point for every object in the FOV according to the relative velocities vectors, in a recursive way that provides the required information to such prediction.

Weather conditions (mainly in the winter) introduce obstacles such as snow on the road, masking separation lines, or puddles that may mislead drivers. The system proposed by the present invention is also adapted to detect such ice and water puddles, based on Ransac algorithm (mainly by enhancing object borders and emphasizing depth changes).

The system proposed by the present invention is also adapted to detect potholes, sinkholes and other kinds of road discontinuity. Positive/negative disparity (from the maps) may be used to deduce if a moving vehicle is in front of an obstacle or a pothole or sinkhole.

Although embodiments of the invention have been described by way of illustration, it will be understood that the invention may be carried out with many variations, modifications, and adaptations, without exceeding the scope of the claims.

The invention claimed is:

1. A multi-spectral vehicular system for providing pre-collision alerts, comprising:
   a) a first pair of stereoscopic infrared (IR) sensors and a second pair of visible light (VL) sensors, the sensors of each of said first and second pairs providing corresponding acquired image streams from a mutual field of view and being synchronized to provide a stereoscopic view;
   b) a stereo data fusion module for:
      b.1) mutually processing data related to said synchronized image streams for each of said two pairs, to detect objects within said mutual field of view;
      b.2) calculate estimated distances to the detected objects based on said mutually processed data;
   c) an Auto-Calibration module which is configured to calculate a set of matching points on an overlapping area captured by two of said sensors that view a three dimensional scene from different positions and to calculate homographies that transform a projective image space of a first of said two sensors to the projective image space of a second of said two sensors using said calculated matching points;
d) for each pair of the sensors, a corresponding Built-in Test (BIT) unit configured to receive images from the sensors of the pair, determine whether quality of the received images is less than a predetermined threshold and transmit to the stereo data fusion module an indicator of the sensor having image quality less than the predetermined threshold; and
e) a cellular based communication module for allowing communication between said two pairs of sensors and a mobile phone or an infotainment system provided with a vehicle on which said system is mounted, on a processor of said mobile phone or infotainment system is running a dedicated application, being a background application, said communication module configured to:
  e.1) monitor a vicinity of said vehicle to detect other vehicles in conjunction with said stereo data fusion module and said Auto-Calibration module;
  e.2) calculate a speed and instantaneous angle of each of said other vehicles with respect to said vehicle; and
  e.3) provide alerts to a driver of said vehicle whenever one or more of said other vehicles are in a path of collision with said vehicle, based on said calculated speed and instantaneous angle of each of said other vehicles and on the speed of said vehicle.

2. The multi-spectral vehicular system according to claim 1, wherein the Auto-Calibration module is also configured to reconstruct a 3D depth map of the stereoscopic view, based on disparity calculation and epipolar geometry related to the calculated matching points, while optical axes of both sensors that view a three dimensional scene from different positions are parallel.

3. The multi-spectral vehicular system according to claim 1, further comprising, for each of the sensors, a Mono Comparison module which is operable to:
  i) compare data related to a corresponding acquired image stream with processed data output from the stereo data fusion module to generate a first compared data indicator; and
  ii) compare the first compared data indicator with the first compared data indicator generated by the Mono Comparison module associated with the other sensor of the same pair of sensors to generate a second compared data indicator.

4. The multi-spectral vehicular system according to claim 3, further comprising an additional data fusion module which is configured to combine the processed data output from the stereo data fusion module with the second compared data indicator generated by each pair of Mono Comparison modules.

5. The multi-spectral vehicular system according to claim 4, further comprising a decision module which is configured to receive from the additional data fusion module an output indicative of an average distance to the detected objects and to output an alert in response via the communication module whenever one or more of the other vehicles are in a path of collision with the vehicle.

6. A multi-spectral vehicular system for providing pre-collision alerts, comprising:
a. a first pair of stereoscopic infrared (IR) sensors and a second pair of visible light (VL) sensors, the sensors of each of said first and second pairs providing corresponding acquired image streams from a mutual field of view and being synchronized to provide a stereoscopic view:
b. a stereo data fusion module for:
  b.1) mutually processing data related to said synchronized image streams for each of said two pairs, to detect objects within said mutual field of view:
  b.2) calculate estimated distances to the detected objects based on said mutually processed data;
c. an Auto-Calibration module which is configured to calculate a set of matching points on an overlapping area captured by two of said sensors that view a three dimensional scene from different positions and to calculate homographies that transform a projective image space of a first of said two sensors to the projective image space of a second of said two sensors using said calculated matching points, wherein the Auto-Calibration module is also configured to reconstruct a 3D depth map of the stereoscopic view, based on disparity calculation and epipolar geometry related to the calculated matching points, while optical axes of both sensors that view a three dimensional scene from different positions are parallel;
d) a Disparity module, which is configured to receive two undistorted, rectified and synchronized images from the Auto-Calibration module and to create a disparity map;
e) a Distance Measurement module for receiving the disparity map and providing distance per pixel;
f) a Ground Estimator module, which receives the disparity map, along with calibrated and synchronized images and provides dense ground plane segmentation;
g) a Clustering module, which receives the dense disparity map and extracts obstacles from the image stream;
h) a Tracking module, which receives the disparity map, a list of obstacles, gyro coordinates and the vehicle speed and provides an array of structures for all tracked obstacles;
i) a cellular based communication module for allowing communication between said two pairs of sensors and a mobile phone or an infotainment system provided with a vehicle on which said system is mounted, on a processor of said mobile phone or infotainment system is running a dedicated application, being a background application, said communication module configured to:
  i.1) monitor a vicinity of said vehicle to detect other vehicles in conjunction with said stereo data fusion module and said Auto-Calibration module;
  i.2) calculate a speed and instantaneous angle of each of said other vehicles with respect to said vehicle; and
  i.3) provide alerts to a driver of said vehicle whenever one or more of said other vehicles are in a path of collision with said vehicle, based on said calculated speed and instantaneous angle of each of said other vehicles and on the speed of said vehicle.

7. The multi-spectral vehicular system according to claim 3, wherein the stereo fusion module receives a blinker status, an IR Image BIT status, a VL Image BIT status, a distance measurement for an obstacle ahead, and obstacle coordinates and size, and outputs to each of the Mono Comparison modules the following processed data: blinker status, obstacle coordinates and bounding box size and the distance to the obstacle.

8. The multi-spectral vehicular system according to claim 1, wherein the BIT unit is capable of performing at least the following tests:

a) quality of the received images;
b) brightness of the received images using a GL histogram;
c) identification of partial occlusions by detecting stains on a windshield of the vehicle;
d) detection of failed channels using a color histogram; and
e) time stamp validation to verify synchronization.

9. A multi-spectral vehicular system for providing pre-collision alerts, comprising:
   a) a first pair of stereoscopic infrared (IR) sensors and a second pair of visible light (VL) sensors, the sensors of each of said first and second pairs providing corresponding acquired image streams from a mutual field of view and being synchronized to provide a stereoscopic view:
   b) a stereo data fusion module for:
      b.1) mutually processing data related to said synchronized image streams for each of said two pairs, to detect objects within said mutual field of view:
      b.2) calculate estimated distances to the detected objects based on said mutually processed data;
   c. an Auto-Calibration module which is configured to calculate a set of matching points on an overlapping area captured by two of said sensors that view a three-dimensional scene from different positions and to calculate homographies that transform a projective image space of a first of said two sensors to the projective image space of a second of said two sensors using said calculated matching points; and
   d. a cellular based communication module for allowing communication between said two pairs of sensors and a mobile phone or an infotainment system provided with a vehicle on which said system is mounted, on a processor of said mobile phone or infotainment system is running a dedicated application, being a background application, said communication module configured to:
      d.1) monitor a vicinity of said vehicle to detect other vehicles in conjunction with said stereo data fusion module and said Auto-Calibration module:
      d.2) calculate a speed and instantaneous angle of each of said other vehicles with respect to said vehicle; and
      d.3) provide alerts to a driver of said vehicle whenever one or more of said other vehicles are in a path of collision with said vehicle, based on said calculated speed and instantaneous angle of each of said other vehicles and on the speed of said vehicle, wherein calibration is performed by:
   i) performing manual calibration upon a designated target, placed in front of the vehicle, on which two independent cameras are installed;
   ii) calculating the orientation of each camera in relation to an optical axis and orientation of each camera;
   iii) finding matching points using a Speeded Up Robust Features (SURF) algorithm;
   iv) refining outliers from the set of matching points and an initial fundamental matrix;
   v) performing iterative fundamental matrix estimation by minimization;
   vi) performing initial calculation of the left and right homographies using epipolar geometry;
   vii) iteratively calculating the best homographies by using the intrinsic parameters of the cameras, center point fix, W-offset;
   viii) estimating the best fitted intrinsic parameters for homographies, valid on the complete set of the frames;
   ix) calculating the set of matching points on the overlapping area captured by the left and right cameras;
   x) calculating homographies that transform the image spaces of both cameras using the overlapped matching points; and
   xi) periodically repeating the process every time the vehicle is not moving.

10. The multi-spectral vehicular system according to claim 6, in which the Disparity module creates the disparity map by:
   i) calculating an initial cost function using a Census correlation;
   ii) performing a Semi-Global Block Matching (SGBM) algorithm with reduced number of degrees, based on the calibration results;
   iii) splitting the image to vertical stripes and calculating the SGBM algorithm per stripe;
   iv) performing global fit from all stripes, to create a global disparity map; and
   v) calculating stereo segmentation on the left stereo image (left disparity) and adding the texture map fitting, while applying averaging adaptive median filter.

* * * * *